(12) United States Patent
Reardon (10) Patent No.: US 10,359,603 B1
(45) Date of Patent: Jul. 23, 2019

(54) LIGHTWEIGHT ADAPTIVE METAL COOLED MIRRORS

(71) Applicant: Patrick Reardon, Madison, AL (US)

(72) Inventor: Patrick Reardon, Madison, AL (US)

(73) Assignee: THE BOARD OF TRUSTEES OF THE UNIVERSITY OF ALABAMA, FOR AND ON BEHALF OF THE UNIVERSITY OF ALABAMA IN HUNTSVILLE, Huntsville, AL (US)

( * ) Notice: Subject to any disclaimer, the term of this patent is extended or adjusted under 35 U.S.C. 154(b) by 0 days.

(21) Appl. No.: 15/583,576

(22) Filed: May 1, 2017

Related U.S. Application Data

(62) Division of application No. 14/465,552, filed on Aug. 21, 2014, now abandoned.

(60) Provisional application No. 61/868,433, filed on Aug. 21, 2013.

(51) Int. Cl.
*G02B 7/195* (2006.01)
*G02B 7/182* (2006.01)
*G02B 7/18* (2006.01)
*G02B 7/185* (2006.01)

(52) U.S. Cl.
CPC ........... *G02B 7/1827* (2013.01); *G02B 7/185* (2013.01); *G02B 7/1815* (2013.01); *G02B 7/195* (2013.01)

(58) Field of Classification Search
CPC ...... G02B 7/1815; G02B 7/181; G02B 7/182; G02B 7/185; G02B 7/195
USPC ................................ 359/845, 846, 847, 848
See application file for complete search history.

(56) References Cited

U.S. PATENT DOCUMENTS

| 1,530,441 | A | * | 3/1925 | Thomson | F21V 29/505 |
| | | | | | 359/845 |
| 2,935,396 | A | | 5/1960 | Pashak | |
| 2,952,189 | A | * | 9/1960 | Pajes | F24J 2/1052 |
| | | | | | 359/847 |
| 3,031,928 | A | * | 5/1962 | Kopito | G02B 26/0825 |
| | | | | | 359/847 |
| 3,337,660 | A | * | 8/1967 | Bagby | B29C 39/00 |
| | | | | | 264/1.9 |
| 3,713,728 | A | * | 1/1973 | Austin | C03B 19/02 |
| | | | | | 359/848 |
| 4,033,676 | A | * | 7/1977 | Brantley, Jr. | F24J 2/125 |
| | | | | | 126/580 |
| 4,214,818 | A | | 7/1980 | Choyke | |
| 4,408,833 | A | | 10/1983 | Gowan | |

(Continued)

OTHER PUBLICATIONS

Reardon, et al, U.S. Appl. No. 14/465,552, entitled, "Lightweight Adaptive Metal Cooled Mirrors," filed on Aug. 21, 2014.

*Primary Examiner* — Ricky D Shafer
(74) *Attorney, Agent, or Firm* — Maynard Cooper & Gale, P. C.; Jon E. Holland (57) ABSTRACT

The present disclosure generally pertains to lightweight adaptive metal cooled mirrors and methods of producing the same. The metal mirror surface is integrated with and supported by metal channels which are physically incorporated into the mirror surface through an additive manufacturing process. These channels are nominally conformal with the desired mirror surface shape. A liquid or gaseous coolant may be directed through some or all of the channels to cool the mirror surface. The mirrors are produced through an additive manufacturing process which allows for the creation of a unitary optical mirror containing finely spaced channels.

11 Claims, 10 Drawing Sheets

(56) References Cited

U.S. PATENT DOCUMENTS

| | | | |
|---|---|---|---|
| 4,443,059 A | | 4/1984 | Wells |
| 4,954,700 A | * | 9/1990 | Trozpek ............ G02B 26/0825 |
| | | | 250/201.9 |
| 5,004,319 A | | 4/1991 | Smither |
| 5,094,519 A | * | 3/1992 | Ealey .................. G02B 7/1815 |
| | | | 236/101 D |
| 5,210,654 A | * | 5/1993 | Williams ................ F24J 2/125 |
| | | | 359/846 |
| 5,889,256 A | * | 3/1999 | Osanai .................. B23K 26/06 |
| | | | 219/121.74 |
| 5,932,055 A | | 8/1999 | Newell |
| 6,216,765 B1 | | 4/2001 | Tseng |
| 6,598,984 B2 | | 7/2003 | Rietz |
| 6,877,869 B2 | | 4/2005 | Exel |
| 7,740,362 B1 | * | 6/2010 | Neil ......................... G02B 5/08 |
| | | | 359/845 |
| 2002/0165304 A1 | | 11/2002 | Mulligan |
| 2003/0016457 A1 | * | 1/2003 | Woodall ............ G02B 26/0825 |
| | | | 359/853 |
| 2008/0169587 A1 | | 7/2008 | Kihara |
| 2010/0027143 A1 | * | 2/2010 | Angel ................ G02B 26/0825 |
| | | | 359/847 |
| 2014/0247512 A1 | | 9/2014 | Scheiding |

* cited by examiner

LIGHTWEIGHT ADAPTIVE METAL COOLED MIRRORS

CROSS REFERENCE TO RELATED APPLICATION

This application is a divisional of U.S. patent application Ser. No. 14/465,552, entitled "Lightweight Adaptive Metal Cooled Mirrors," and filed on Aug. 21, 2014, which is incorporated herein by reference. U.S. patent application Ser. No. 14/465,552 claims the benefit of U.S. Provisional Patent Application No. 61/868,433, entitled "Lightweight Adaptive Metal Cooled Mirrors," and filed on Aug. 21, 2013, which is incorporated herein by reference.

RELATED ART

Mirrors are one of the most commonly used optical elements. Certain high energy laser applications produce a great amount of heat. Use of these lasers with optical mirrors requires the mirror surface to be covered with specialized coatings to prevent thermal damage. Imperfect coatings allow energy, and thus heat, to enter the metal components and deform the mirror. Channels may be integrated into the mirror to provide an area for cooling substances which cool the surface of the structure. Conventional fabrication techniques utilize etching or other subtractive methods to create the channels on the surface of the metal mirror. The optical surface must then be adhered on top of the etched grooves such that every channel is completely sealed, a process that is difficult of not impossible to accomplish. In addition, the grooves must be spaced at close enough intervals so that the optical surface is evenly cooled and warping of the mirror surface is prevented.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to lightweight adaptive metal cooled mirrors and methods of producing the same. The metal mirror surface is integrated with metal channels which are physically incorporated into the mirror surface through an additive manufacturing process. These channels are nominally conformal with the desired mirror surface shape. A liquid or gaseous coolant may be directed through some or all of the channels to cool the mirror surface. For light weight applications, the channels may be evacuated and sealed, filled with gases and sealed, filled with some substance that would flow and then set, filled with some substance that would flow but not set, or left to ambient conditions. If the material filling the channels has an appropriate phase change temperature, the filling can be used to provide the latent heat of fusion to provide passive thermal control of the mirror. The mirrors are produced through an additive manufacturing process which allows for the creation of a unitary optical mirror containing finely spaced channels.

As known in the art, additive manufacturing is a method of creating a three-dimensional structure of almost any shape by printing. The structure is created from a model often in the form of an electronic data source, for example a solid CAD model. The manufacturing method is additive in that successive layers of material are printed, or deposited, under computer control, gradually forming the desired object. The printing methods and the materials available for printing these structures have been expanding. They include, but are not limited to, such processes as stereo lithography and laser sintering. Major advantages of additive manufacturing include the ability to create three-dimensional structures that would otherwise be impossible or extremely difficult to produce, the ability to create very fine features, and the efficient use of expensive materials.

Figure 1A:
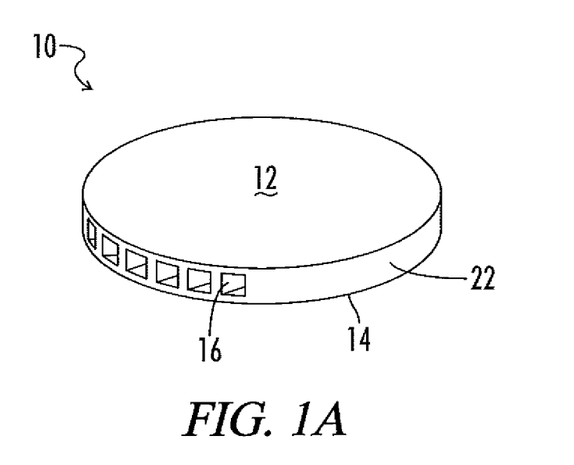
FIG. 1A illustrates an exemplary flat mirror with square cross section channels.

FIG. 1A illustrates an exemplary embodiment of a lightweight mirror. In one embodiment, mirror 10 is constructed from a metal, for instance titanium, copper, nickel, cobalt, aluminum, chrome, steel, stainless steel, a metal composite or metal alloy. In an additional embodiment, the mirror 10 may be constructed from more than one type of metal. Other materials may be used to construct mirror 10 in other embodiments. The advantages of using metal for these mirrors include thermal uniformity due to their relatively high thermal conductivity, ease of manufacture due to their ability to be machined, polished, and diamond turned, and simplification of use due to the ability to easily integrate the optical surface definition and the mounting structures in the same substrate employing a single machining process.

Mirror 10 includes a substrate 22 with an optical surface 12 and a bottom surface 14. The substrate 22 has a plurality of square-shaped cross-sectional hollow channels 16 within its interior. The channels 16 may have other shapes in other embodiments, for example round, rectangular or irregular configurations. Mirror 10 is integrated with channels 16. The channels 16 are physically integrated in the mirror 10 through an additive manufacturing process, as will be described in more detail herein. Additionally, the channels 16 are nominally conformal with the desired mirror optical surface shape. The additive manufacturing process allows for the production of very thin channels which are finely spaced within the mirror 10. For example, the channels 16 may be of any size needed for the desired optical application, for instance from about 100 microns to millimeters in width. The interior wall thickness of channels 16 is limited by the size of the metal powder particles used in the additive manufacturing process. Certain metal powders appropriate for additive manufacturing processes have a particle size of 10-20 microns. As a result, the channel 16 wall thickness may be of comparable dimensions. The size and spacing of the channels 16 is limited only by the metal utilized and the additive manufacturing process used to produce the mirror 10.

In one embodiment, the channels 16 run the entire length of the mirror 10 so that a liquid or gaseous coolant (not shown) may flow through some or all of the channels 16. This provides thermal control of the mirror optical surface 12. The presence of these coolants, and the fine spacing between the channels 16, acts to uniformly decrease the temperature of the optical surface 12 so as to prevent its bending or quilting. Since additive manufacturing enables the production of relatively fine structures, and metal has a relatively high thermal conductivity, the channels 16 may be structured so that no measurable temperature variations will occur between channels 16. Temperature variation may cause bending of the optical surface. This effect, called quilting, can become significant when coolant channels 16 are employed in glass-based cooled mirrors, or if the channel walls are wide enough to make it impossible to maintain uniform temperatures in the mirror optical surface 12 or the nearby channel substrate 22.

In one embodiment, the formation of the channels 16 within the mirror 10 acts to reduce the weight of the mirror 10 by removing and thus decreasing the amount of material comprising mirror 10. In one example, the area of the channel 16 to substrate 22 is 1:1. In other embodiments, the ratio of channel 16 to substrate may be 2:1, 3:1, or other ratio. For light weight applications, the channels 10 may be evacuated and sealed, or filled with a gaseous substance and sealed from the outside environment. In an additional embodiment, the channels 16 may be filled with some substance that would flow and then set, for instance a wax-like substance, or filled with some substance that would flow but not set. Additionally, the channels 16 may be left to ambient conditions. If the material filling the channels 16 has an appropriate phase change temperature, the filling can be used to provide the latent heat of fusion to provide passive thermal control of the mirror 10.

Figure 1B:
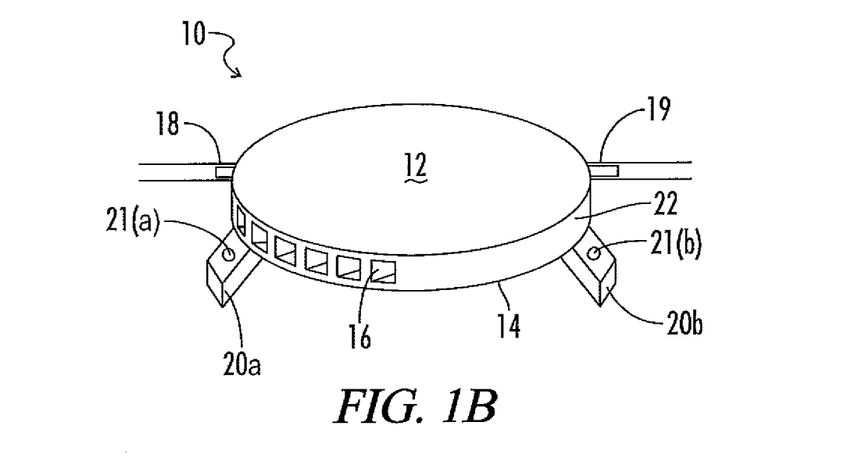
FIG. 1B illustrates the flat mirror of FIG. 1A with additional support structures.

Referring now to FIG. 1B, the mirror 10 may include various support elements. These support elements may be formed during the additive manufacturing process. As a result, the support elements are manufactured from the same material as the mirror 10 and are an integrated part of the mirror 10. In the embodiment illustrated in FIG. 1B, the mirror 10 includes support elements such as hose connections 18 and 19 which allow for the introduction and removal of a liquid or gas coolant (not shown). In addition, the mirror 10 illustrated in FIG. 1B further includes mounting brackets 20a and 20b which define bolt holes 21a and 21b, respectively. The mounting brackets 20a and 20b may be utilized to secure the mirror 10 to a mounting surface (not shown), as will be known to one of skill in the art. These support structures (hose connections 18a and 18b and mounting brackets 20a and 20b) are manufactured simultaneously with the other portions of mirror 10 to produce a single unitary structure.

As illustrated in FIGS. 2-7, the three-dimensional metal channels produced by the additive manufacturing process may be patterned in a number of ways, including a series of straight, curved or jagged lines, annular rings, loops, or lines that provide access to large areas such as hexagons, squares, rectangles, or other shapes. These regions or lines or loops or rings can flow in a single plane, or can be accessed from paths below the surface of channels. The channels can consist of many layers of channels, independent or connected in a variety of ways.

Figure 2:
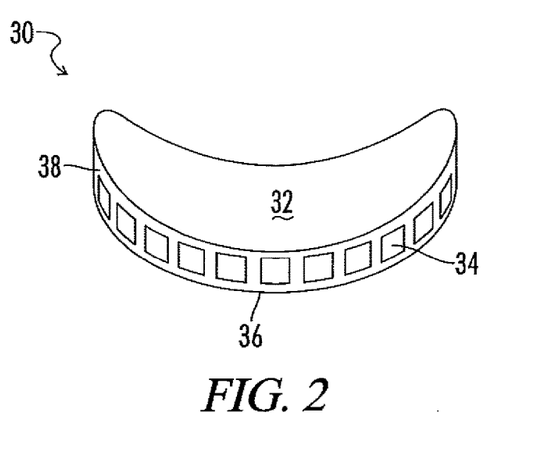
FIG. 2 illustrates an exemplary curved mirror with square cross section channels.

Referring now to FIG. 2, mirror 30 includes a curved or concave optical surface 32 and a convex bottom 36. The substrate 38 of mirror 20 defines square cross sectioned channels 34. The length of the channels 34 follows the concave optical surface 32. The channels 34, which follow the mirror 30 surface profile, may run the complete length of mirror 30. In an additional embodiment, the channels 34 may be connected, curved or directed into larger volumes under the concave optical surface 32 (not shown). Additive manufacturing enables the production of the channels 34 in the curved mirror 30. It is difficult, if not impossible, to create the curved channels 34 with subtractive methods such as etching without introducing defects or deformations into the optical surface.

Figure 3:
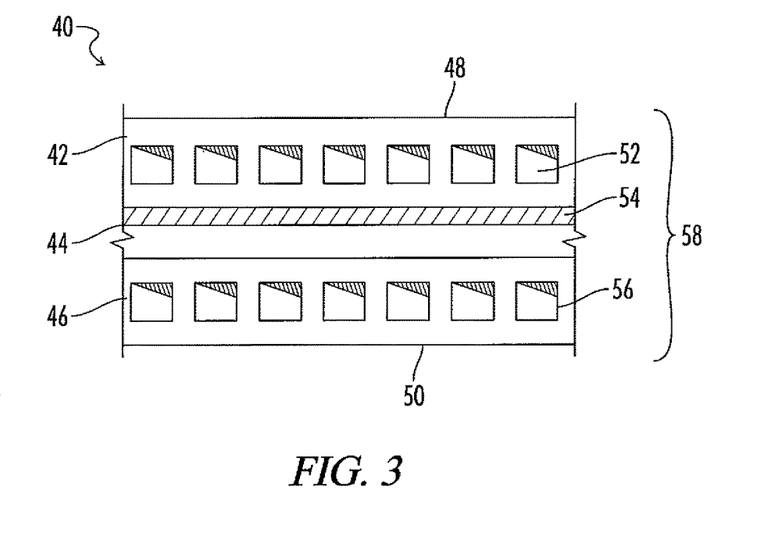
FIG. 3 illustrates a side view of an exemplary mirror with multiple layers of channels.

FIG. 3 illustrates a mirror 40 with multiple (i.e., at least two) layers of channels 42, 44 and 46. Mirror 40 comprises a top optical surface 48 and a bottom surface 50. In the embodiment illustrated in FIG. 3, mirror 40 includes three layers 42, 44 and 46 of channels 52, 54 and 56, respectively, within substrate 58. The top layer 42 and bottom layer 46 of channels 52 and 56 project into the mirror substrate 58. The middle layer 44 includes channels 54 running orthogonal to the top 42 and bottom 46 layers. In one embodiment, the channels 52, 54 and 56 of the different layers 42, 44 and 46 are connected (not shown). The connection may occur within the substrate of the mirror 40 (not shown) or along the outside edges of the mirror near the hose connection 18 (see FIG. 1B). In an additional embodiment, the channels 52, 54 and 56 of each of the different layers 42, 44 and 46 are independent (not shown). Separation of the channels 52, 54 and 56 allows for greater thermal control.

In an additional embodiment, the channels described herein may be independent in that they do not contact other channels, or they may be coupled together in groups or as a whole. This coupling can be used to provide spatially varying thermal control of the mirror surface. Thus, if the mirror was employed in a high energy laser system where the beam profile is non-uniform, such as a Gaussian beam, the thermal control channels can either be denser, or have higher flow, in the regions of maximum optical flux, making the thermal control more efficient and stable. This spatial control also provides the ability to selectively set the temperature profile of the surface. Selectively defining the temperature profile allows for the spatial adjustment of the expansion of the mirror. As a result, the figure of the mirror can be regulated, providing for slow adaptive mirror control.

Figure 8:
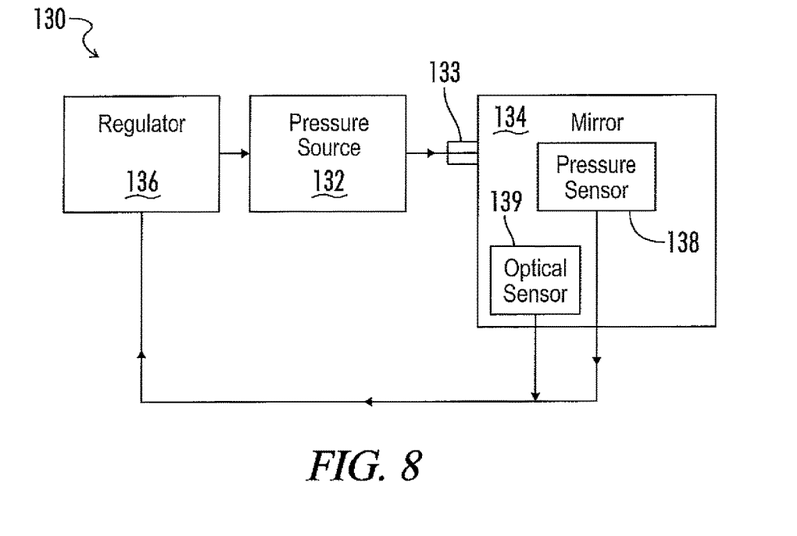
FIG. 8 is a block diagram illustrating an exemplary embodiment of a system for adaptively cooling metal optical mirrors.

The spatial adjustment of the mirror may also be controlled by changing the pressure of the coolant within the channels. Increasing or decreasing the pressure may cause forces within the channels to bend or deform the optical surface. The extent of the bending or deformation may be controlled by the amount of pressure applied to the channels. FIG. 8 illustrates an exemplary embodiment of a system 130 for spatially adjusting the expansion of a metal optical mirror. The system 130 includes a pressure source 132 for applying desired pressure to the channels (not shown) integrated into mirror 134. The pressure source 132 may be, for example, a pump or a pressurized controller with a valve (not shown) which adjusts the force of the flow of a liquid or gaseous material, for instance a coolant, into the channels. The pressure source 132 is joined to the channels by a connector 133 so that the liquid or gaseous material is directed into the channels. The connector 133 may comprise, for instance a small hose or tube. Other types of connectors 133 are possible in other embodiments. The connector 133 forms an air tight seal with the mirror so that the proper pressure may be maintained within the channels. The application of pressure by the pressure source 132 is adjusted by regulator 136. The regulator 136 can be implemented in software, hardware, firmware or any combination thereof. In one embodiment, the regulator 136 is implemented in software operated on a computing device, such as a lap-top or desk-top computer. System 130 also includes a pressure sensor 138 which senses the pressure within the channels within the mirror 134. The pressure sensor provides feedback to the regulator 136 so that the amount of pressure supplied by the pressure source 132 may be adjusted to maintain the desired amount of force within the channels. The pressure may be varied among channels within the same mirror for even greater control of the shape of the optical surface.

In an additional embodiment, an optical sensor 139 may be employed which monitors a specific optical performance factor of the mirror. The pressure within the channels may be altered, i.e., increased or decreased, when a specific parameter is met. For example, in high energy laser applications, an optical sensor may detect when a focused beam has reached its maximum intensity on the optical surface. The optical sensor 139 would then transmit a signal to the regulator 136 to either increase or decrease the pressure to the channels provided by the pressure source 132. The pressure within the channels may then be adjusted in response to the beam intensity in order to control the mirror deformations. In one embodiment, the pressure within the channels may be altered to deform the mirror surface to provide for beam signal optimization. In an additional embodiment, the pressure in the channels may be altered to deform the mirror to prevent damage to the optical surface of the mirror.

Figure 4A:
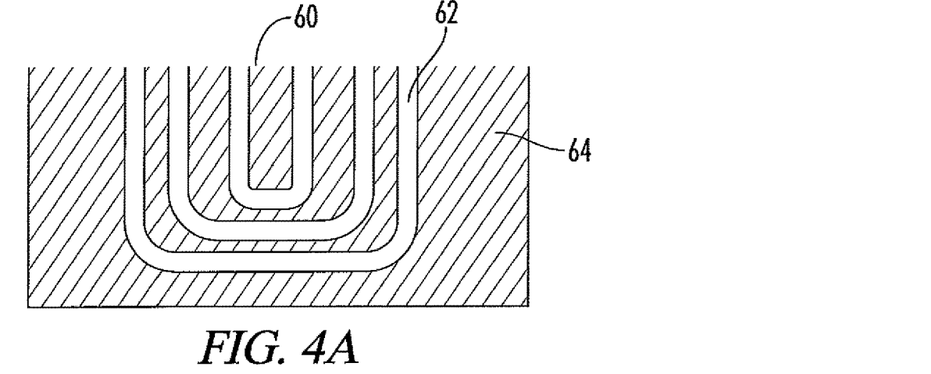
FIG. 4A is a top view of an exemplary mirror with curved channels.
Figure 4B:
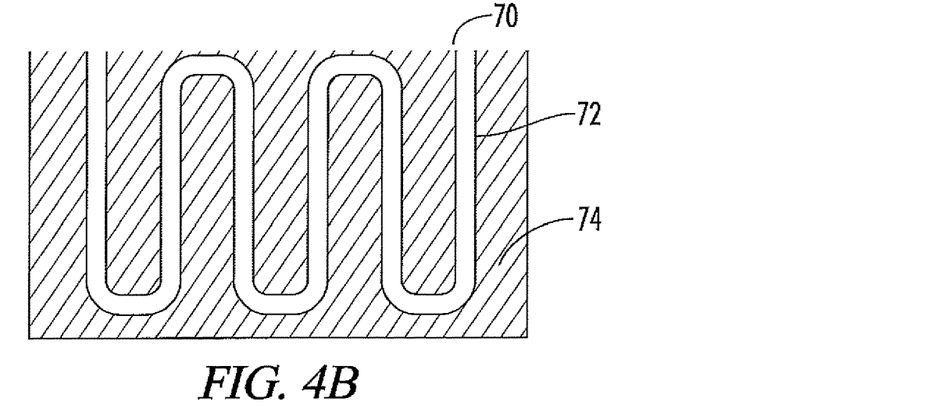
FIG. 4B is a top view of an additional exemplary mirror with curved channels.
Figure 4C:
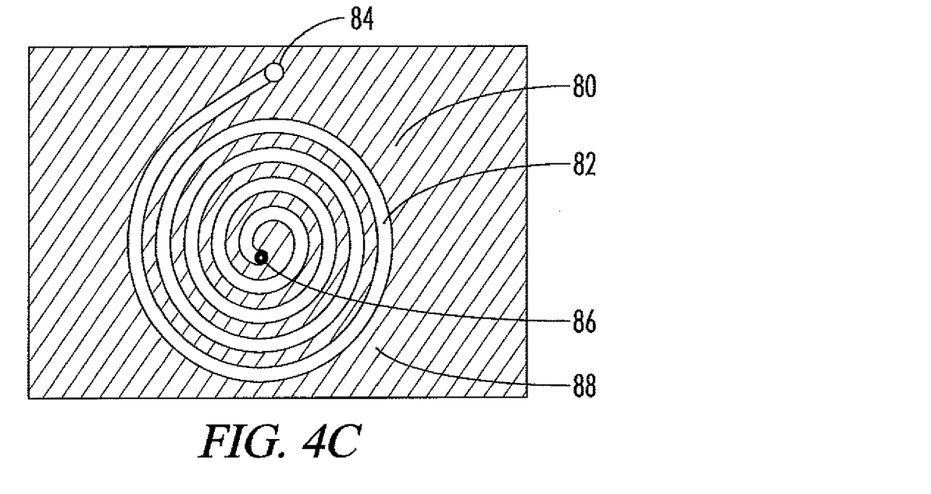
FIG. 4C is a top view of an additional exemplary mirror with curved channels.

FIGS. 4A-4C illustrate embodiments of the presently disclosed mirrors comprising alternatively shaped channels. These figures exemplify the top view of an optical mirror. In each of FIGS. 4A-4C the top layer of the mirror substrate has been removed for illustrative purposes to reveal the integrated channels. The mirror 60 embodied in FIG. 4A contains a sequential series of "U" shaped channels 62 within the substrate 64 while the mirror 70 illustrated in FIG. 4B includes a channel 72 with an "S" or serpentine shape within the substrate 74. The channels 62 and 72 depicted with respect to mirrors 60 and 70, respectively (FIGS. 4A and 4B) may provide coolant flow in any direction, dependent on the particular application of the mirrors 60 and 70. FIG. 4C illustrates a mirror 80 with a spiral channel 82 within substrate 88. In this embodiment, the coolant flow may enter and exit the channel 82 through either one of ports 84 and 86. Each of ports 84 and 86 may be located either above or below the plane of the mirror 80 as is necessary for the particular application. In an additional embodiment, the pressure of the coolant within the channels may be changed.

Figure 5:
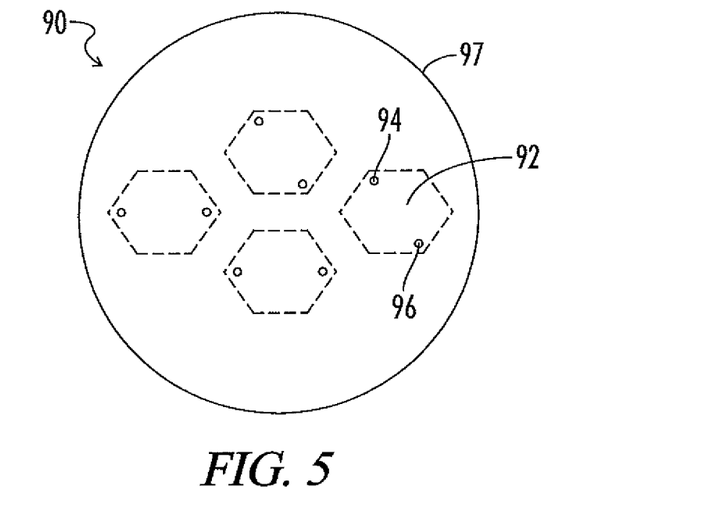
FIG. 5 is a top view of an exemplary mirror with voids and access holes.

FIG. 5 illustrates a top view of a mirror 90 defining a series of depressions or voids 92 within the mirror substrate 97. In the embodiment illustrated in FIG. 5, the voids 92 have a hexagonal shape, although other shapes are possible in other embodiments. The coolant substance may collect or pool within the voids 92. The void 92 may contain any number of access holes 94 and 96 where the fluid or gas coolant (not shown) may enter and exit the void 92. In an additional embodiment, the void 92 may be sealed so that the pressure of the coolant within the channels may be controlled.

Figure 6:
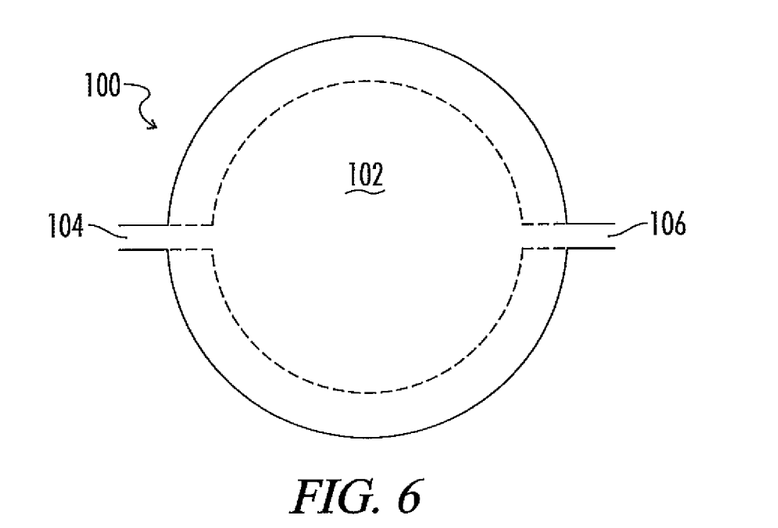
FIG. 6 is a top view of an exemplary mirror with a void containing at least one access hole.

FIG. 6 illustrates a top view of a mirror 100 defining a circular void 102 where a liquid or gas coolant (not shown) may pool. Although the void 102 illustrated in FIG. 6 has a circular shape, other shapes are possible in other embodiments. The void 102 may contain any number of access holes 104 and 106 where the coolant (not shown) may enter and exit. In an additional embodiment, the void 102 may be sealed so that the pressure of the coolant within the channels may be controlled.

Figure 7:
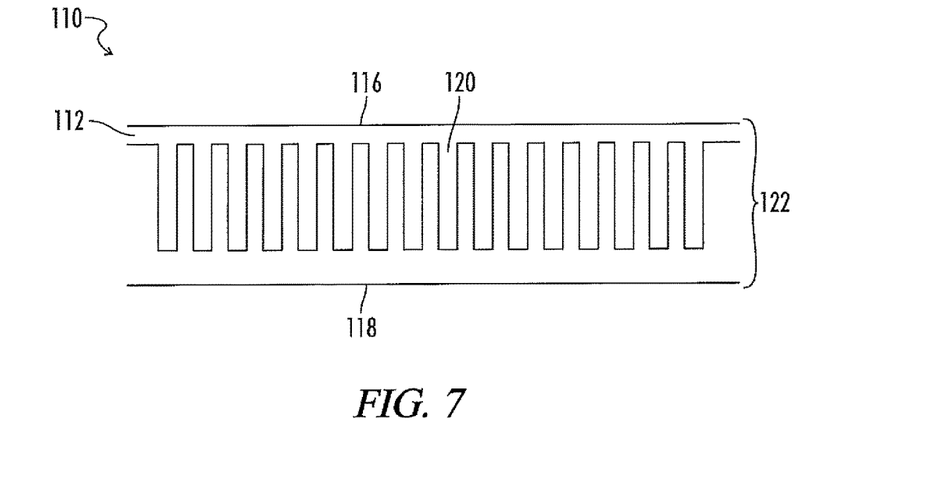
FIG. 7 is a side view of an exemplary mirror with a channel containing teeth-like projections.

FIG. 7 illustrates the side view of a mirror 110 with substrate 122 containing an optical surface 116 and a bottom surface 118. Substrate 122 further defines a channel 112 which runs the length of the mirror 100. The channel 112 includes a series of teeth-like shaped downward-projecting depressions 120. The presence of the depressions 120 decreases the amount of metal present in the mirror 110 and also increases the area available to hold the desired coolant.

Figure 9:
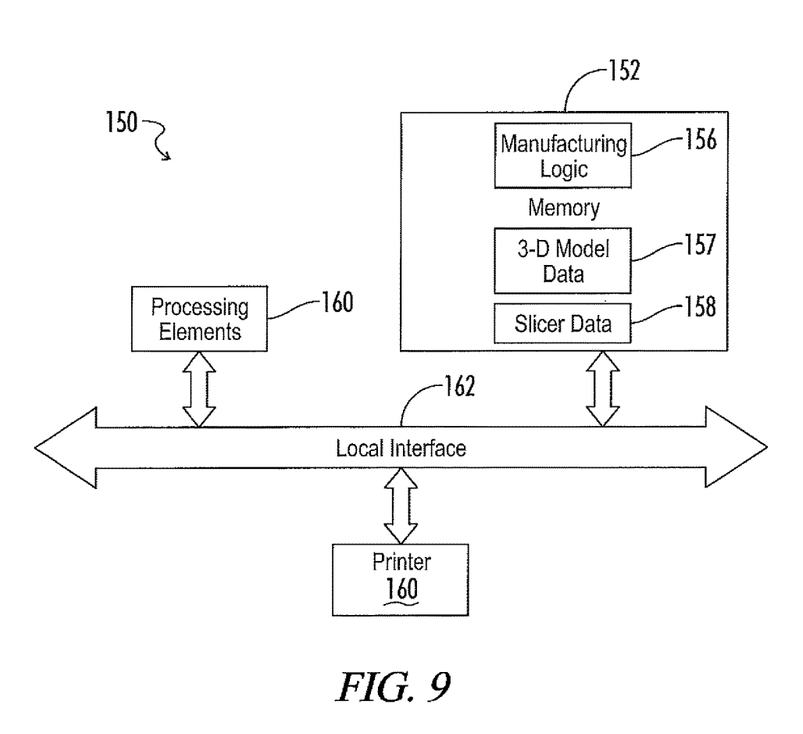
FIG. 9 is a block diagram illustrating an exemplary embodiment of a system for manufacturing metal optical mirrors.

FIG. 9 illustrates an additional system 150 for producing lightweight adaptive metal cooled mirrors using additive manufacturing processes. Such processes are well known to one of skill in the art and may include, for example, extrusion, wire or granular based deposition. Other types of additive manufacturing processes may be utilized in other embodiments. In one embodiment, the presently described mirrors are produced from a 3D printable model created with a computer aided design package or via a 3D scanner. As will be known to one of skill in the art, many computer programs are available for the 3D scanning process, which involves analyzing and collecting digital data on the shape and appearance of a real object. Based on this data, three-dimensional models of the scanned mirror can then be produced. Many 3D printing marketplaces have emerged over the last years including Shapeways, Thingiverse, MyMiniFactory and Threeding.

In this embodiment, the electronic three-dimensional model of the mirror is then processed by a type of computer software, often referred to as a "slicer", which converts the model into a series of thin layers and produces a file containing instructions tailored to a specific printer. Many types of slicer software programs are commercially available, as will be known to one of skill in the art. A three-dimensional printer follows software instructions to lay down successive layers of metal material to build the mirror from a series of cross sections. Such metals may include, for instance titanium, copper, nickel, cobalt, aluminum, chrome, steel, stainless steel, a metal composite or metal alloy. In an additional embodiment, the mirror may be constructed from more than one type of metal. Other materials may be used to construct the mirror in other embodiments. These metal layers, which correspond to the virtual cross sections from the CAD model, are joined or automatically fused to create the final mirror shape. An advantage of this technique is its ability to create the very fine and closely spaced channels within the interior of the mirror, regardless of the size or shape of the mirror. The additive manufacturing process may be used to create channels in mirrors with curved or convex optical surfaces. In addition, this method can produce other mirror supporting structures, such as hose connectors and bolt connections, as fully integrated parts of the mirror.

The surface of the metal mirror must be finished after the completion of the adaptive manufacturing process to produce a high quality optical surface. The quality of the optical surface will be affected by such defects as scratches and pits. Surfaces that see high power levels, for example in high energy laser applications, require finer finishing because defects can cause increased absorption of energy and thus damage the optic. Generally, the finishing process involves removing a small layer of the optical surface, for instance one to ten microns, in order to remove any defects such as scratches or pits. Common finishing procedures may include, for example, diamond machining or high quality optical grinding and polishing. Other finishing procedures are possible in other embodiments.

Referring again to FIG. 9, the system 150 comprises manufacturing logic 156 for generally controlling the manufacturing system 150 and to manage data and other components within the system 150, as will be described in more detail hereinafter. The manufacturing logic 156 may include a conventional slicer and other programs for performing additive manufacturing. The manufacturing logic 156 can be implemented in software, hardware, firmware or any combination thereof. In the exemplary manufacturing system 150 illustrated in FIG. 9, the manufacturing logic 156 is implemented in software and stored in memory 152 of the system 150.

The exemplary manufacturing logic 156 depicted by FIG. 9 comprises at least one conventional processing element 160, such as a digital signal processor (DSP) or a central processing unit (CPU), that communicates to and drives the other elements within the system 150 via a local interface 162, which can include at least one bus. Furthermore, a three-dimensional printer 160 is used to create the mirror. The printer 160 creates the mirror by laying down successive layers of metal material until the entire mirror is created.

As shown by FIG. 9, the three-dimensional model data 157 is stored in memory 152. The three-dimensional model data 157 is indicative of the three-dimensional model created by the 3D scanning process discussed above. The memory 152 also stores slicer data 158 that defines the virtual cross sections or slices from the CAD model.

Figure 10:
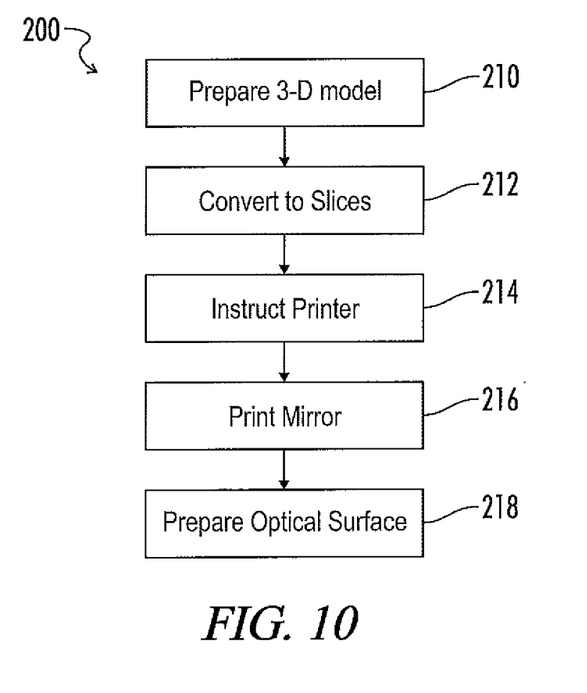
FIG. 10 is a is a flow chart illustrating an exemplary method for manufacturing metal optical mirrors, such as is depicted by FIG. 9.

In an additional embodiment illustrated in FIG. 10, the present disclosure pertains to a method of producing light weight adaptive metal cooled mirrors using an additive manufacturing processes. As demonstrated in block 210, a three-dimensional model of a desired metal mirror containing integrated channels is prepared using a computer aided design package or a 3D scanner. Numerous computer programs are available for the 3D scanning process as will be known to one of skill in the art. The shape and appearance of the desired mirror is analyzed so that digital data may be collected. Based on this data, three-dimensional models of the scanned mirror can then be produced and stored in the 3-D model data 157 of the memory 152 (FIG. 10). As illustrated in bock 212, the electronic three-dimensional model of the mirror is then processed by the slicer and converted into series of thin layers. The information regarding the thin layers is then stored in the slicer data 158 of memory 152 (FIG. 10). Referring now to block 214 and FIG. 10, the manufacturing logic 156 then directs the printer 160 and produces a file containing instructions tailored to a specific printer. The three-dimensional printer then lays down or deposits down successive layers of metal material, based upon the slicer data 158 of memory 152, until the entire mirror is created (block 216).

The presently disclosed method includes the further steps to produce an optical surface of sufficient quality for specific applications (block 218). In one embodiment, the mirror may be processed by diamond turning of the additively manufactured metal optical surface. In an additional embodiment, the optical surface may be ground and polished, or plated with an additional material which may include, but is not limited to, electroless nickel or other nickel platings. Alternatively, the additively manufactured subsurface structure may be printed on to a plate of the desired optical form which is consistent with the additive material.

Now, therefore, the following is claimed:

1. A method comprising:
   providing a metal mirror comprising a metal substrate that has an optical surface for reflecting light, the metal substrate defining a plurality of hollow channels, the plurality of hollow channels including at least a first hollow channel and a second hollow channel;
   applying a first pressure to the first hollow channel with a pressure source; and
   adjusting the first pressure in the first hollow channel to a second pressure to deform at least a portion of the optical surface, wherein the providing comprises:
   (1) forming the metal substrate using additive manufacturing techniques, the forming the metal substrate comprising depositing layers of metallic material in a pattern using the additive manufacturing techniques such that the layers of the metallic material define the plurality of hollow channels in the metal substrate;
   (2) filling the first hollow channel with a coolant; and
   (3) finishing the optical surface, the finishing comprising removing a layer of the metallic material from the metal substrate.

2. The method of claim 1, further comprising:
   detecting an amount of pressure within the first hollow channel with a pressure sensor; and
   changing an output pressure from the pressure source in response to the detected amount of pressure.

3. The method of claim 1, wherein the applying the first pressure includes flowing a liquid or gaseous material through the first hollow channel.

4. The method of claim 1, further comprising controlling an extent of deformation in the at least a portion of the optical surface based on an amount of the second pressure.

5. The method of claim 1, further comprising regulating application of pressure by the pressure source with a regulator.

6. The method of claim 1, further comprising applying a third pressure to the second hollow channel while the first hollow channel is at the second pressure, wherein the third pressure is different than the second pressure.

7. The method of claim 1, further comprising:
   monitoring a performance factor of the metal mirror with an optical sensor,
   wherein the adjusting is performed in response to the monitored performance factor.

8. The method of claim 1, further comprising sensing, with an optical sensor, light reflected from the optical surface, wherein the adjusting is based on the sensing.

9. The method of claim 6, further comprising adjusting the third pressure in the second hollow channel to a fourth pressure to deform at least a portion of the optical surface.

10. The method of claim 9, wherein the first hollow channel and the second hollow channel are defined by a wall between the first hollow channel and the second hollow channel, and wherein a thickness of the wall is less than 100 microns.

11. The method of claim 9, wherein the providing further comprises filling the second hollow channel with a coolant.

* * * * *